United States Patent [19]

McKinney et al.

[11] Patent Number: 5,029,602
[45] Date of Patent: Jul. 9, 1991

[54] AUTOMATED CHEMICAL STORAGE AND CHEMICAL FEED SYSTEM

[76] Inventors: John M. McKinney, 26 Elmwood Dr., Indian Head Park, Ill. 60525; Ali D. Ata, 6719 S. Stonewall Ave., Downers Grove, Ill. 60516; Robert B. Wierzba, 7770 W. 83rd St., Bridgeview, Ill. 60455; Wililam F. Flowers, 1339 Ada La., Naperville, Ill. 60540

[21] Appl. No.: 496,407

[22] Filed: Mar. 20, 1990

Related U.S. Application Data

[63] Continuation-in-part of Ser. No. 385,989, Jul. 21, 1989, which is a continuation of Ser. No. 223,682, Jul. 25, 1988, abandoned.

[51] Int. Cl.$^5$ .............................................. B67D 5/54
[52] U.S. Cl. .................................. 137/209; 137/899; 280/47.2
[58] Field of Search ................ 137/209, 899, 899.3; 280/47.19, 47.2

[56] References Cited

U.S. PATENT DOCUMENTS

| | | | |
|---|---|---|---|
| 1,408,400 | 2/1922 | Richards | 280/47.19 |
| 2,131,673 | 9/1938 | Robinson | 280/47.19 |
| 2,365,644 | 12/1944 | Matje | 137/209 X |
| 3,407,831 | 10/1968 | Anthony | 137/209 |
| 4,653,765 | 3/1987 | Smalley | 280/47.2 |
| 4,858,940 | 8/1989 | Cheng | 280/47.2 |

Primary Examiner—Alan Cohan
Attorney, Agent, or Firm—Lloyd L. Zickert; Robert A. Miller; Donald G. Epple

[57] ABSTRACT

An automated chemical storage and feed system for a use station to chemically treat and monitor a process at a use station where the process is being run, including one or more base tanks at the use station storing chemicals and having means intermittently or continuously feeding the chemicals to the process. A level sensor is provided in each base tank to determine the chemical level and to deliver a signal to a control and processing unit. Sensors may be provided on the process for generating chemical condition information to the control and processing unit. A telemetry system receives the information from the control and processing unit and transmits it to a supply station where the information is recorded and read out by a person to monitor the chemical supply in the base tank and to monitor the chemical condition of the process so that the chemical feed may be adjusted as needed from the supply station and so that further chemical may be delivered to the use station to be introduced into the base tank for maintaining an adequate supply to prevent interruption of the process. Refill tanks are shipped from the supply station to the use station, transported to the base tank, and emptied into the base tank. Thereafter, the refill tanks are returned to the supply station to be refilled. A unique hand truck is used at the use station to transport a refill tank to the base tank and to handle the refill tank during unloading.

5 Claims, 10 Drawing Sheets

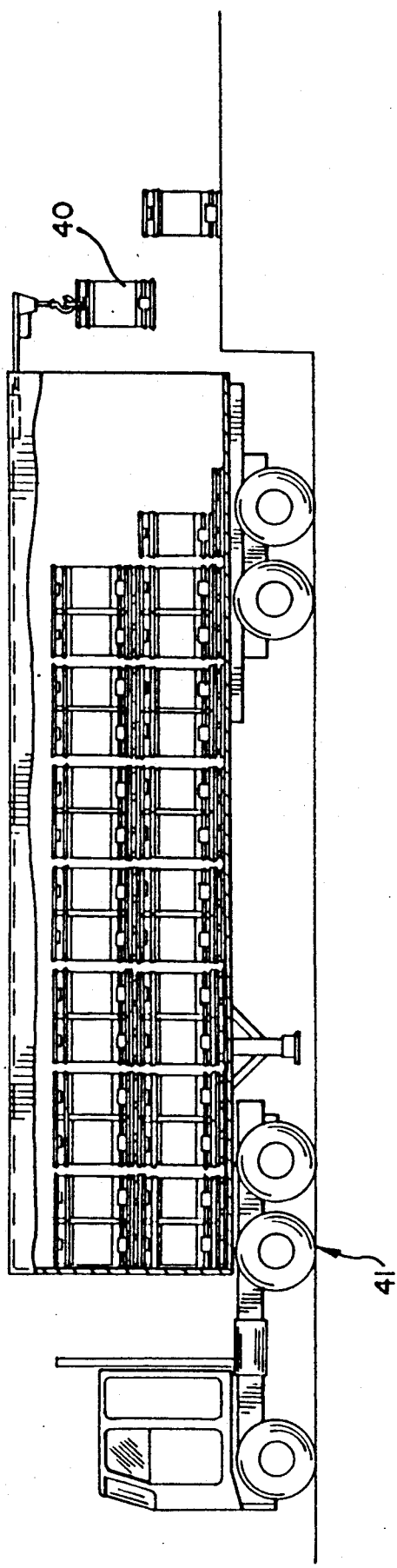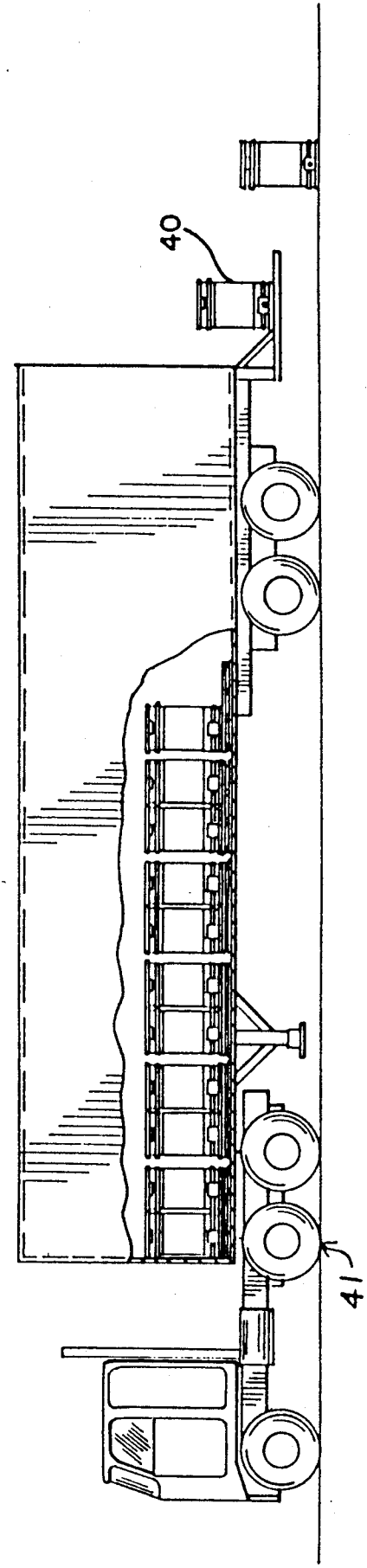

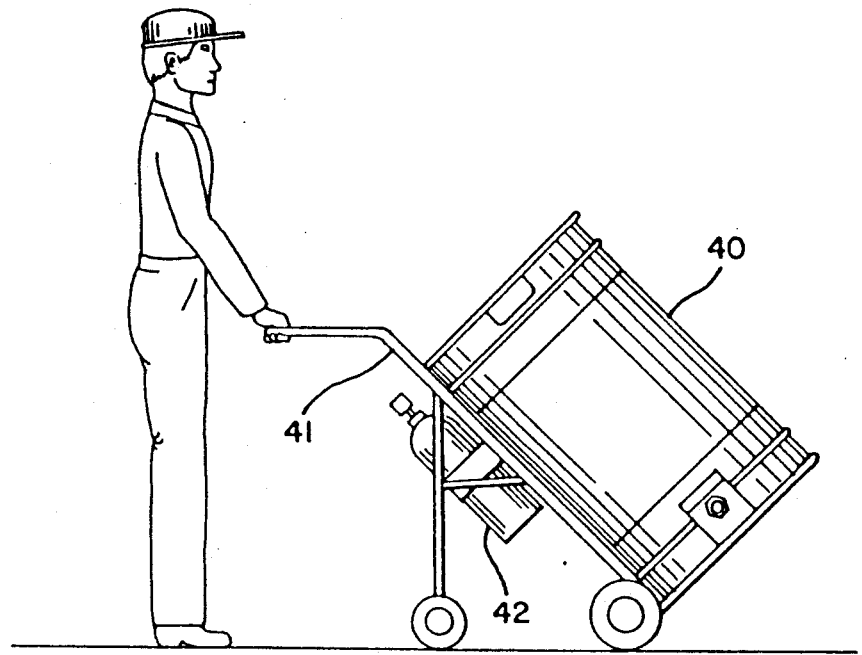
FIG_5_
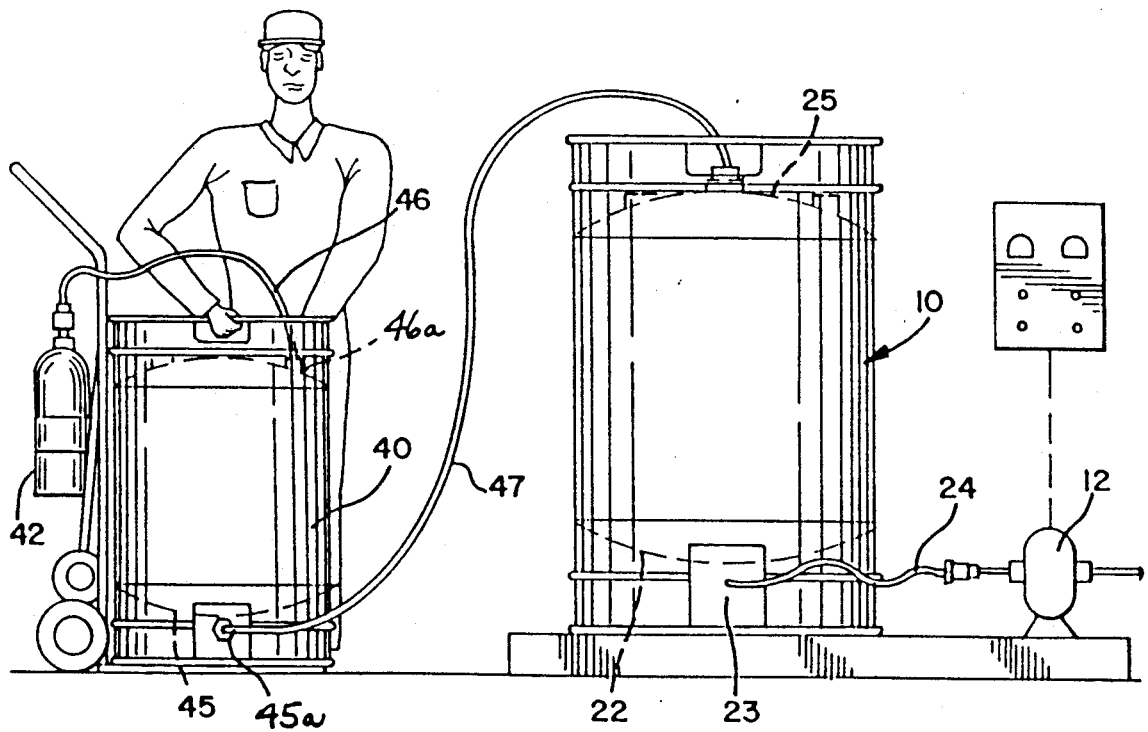
FIG_6_

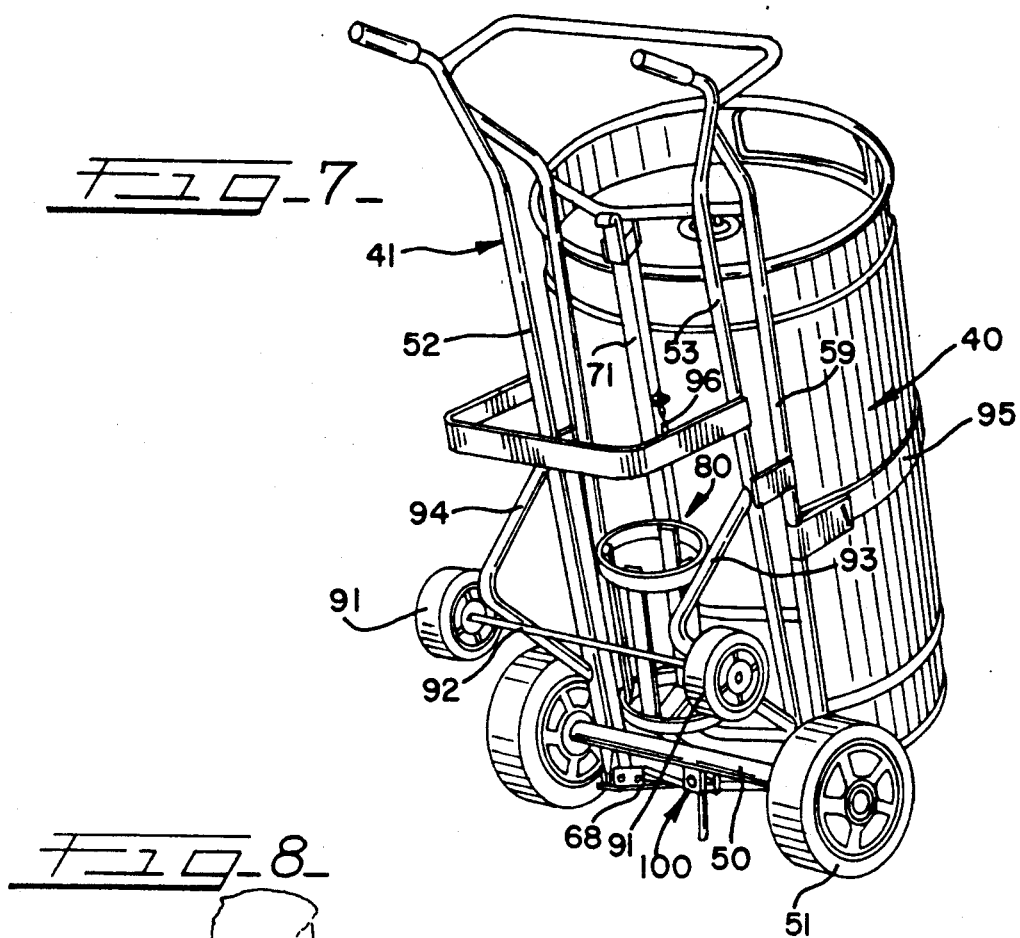
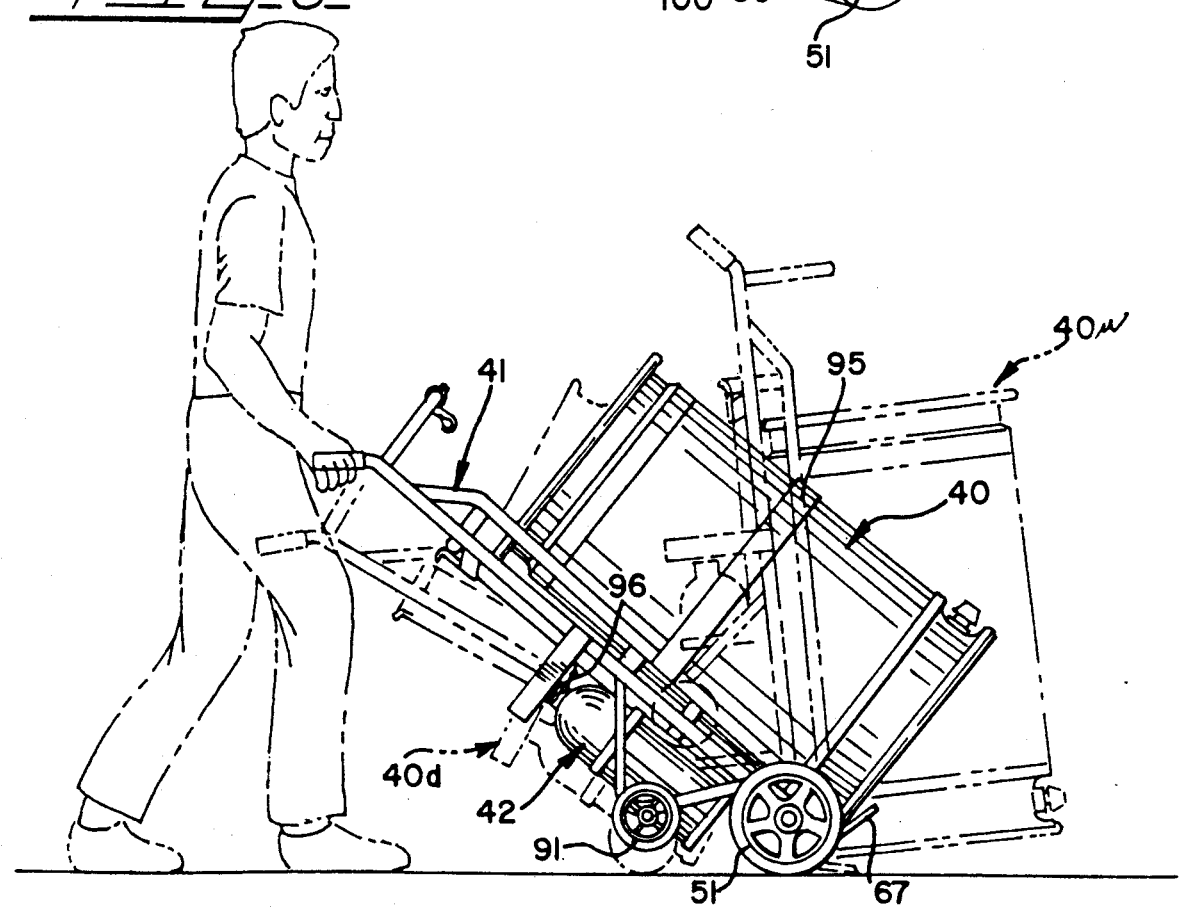

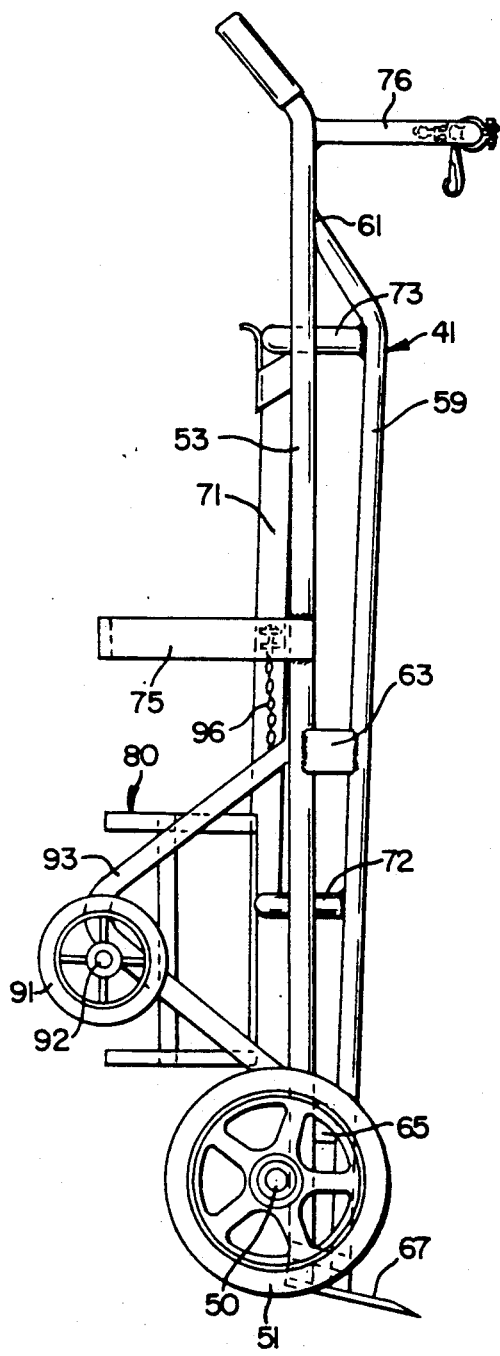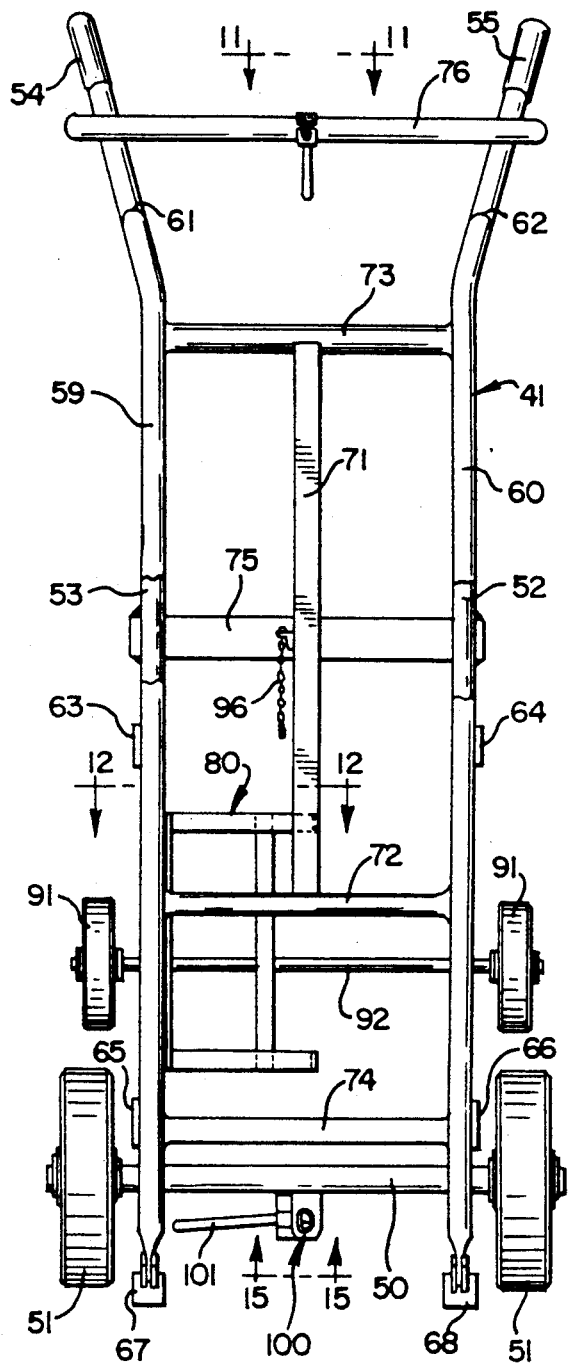

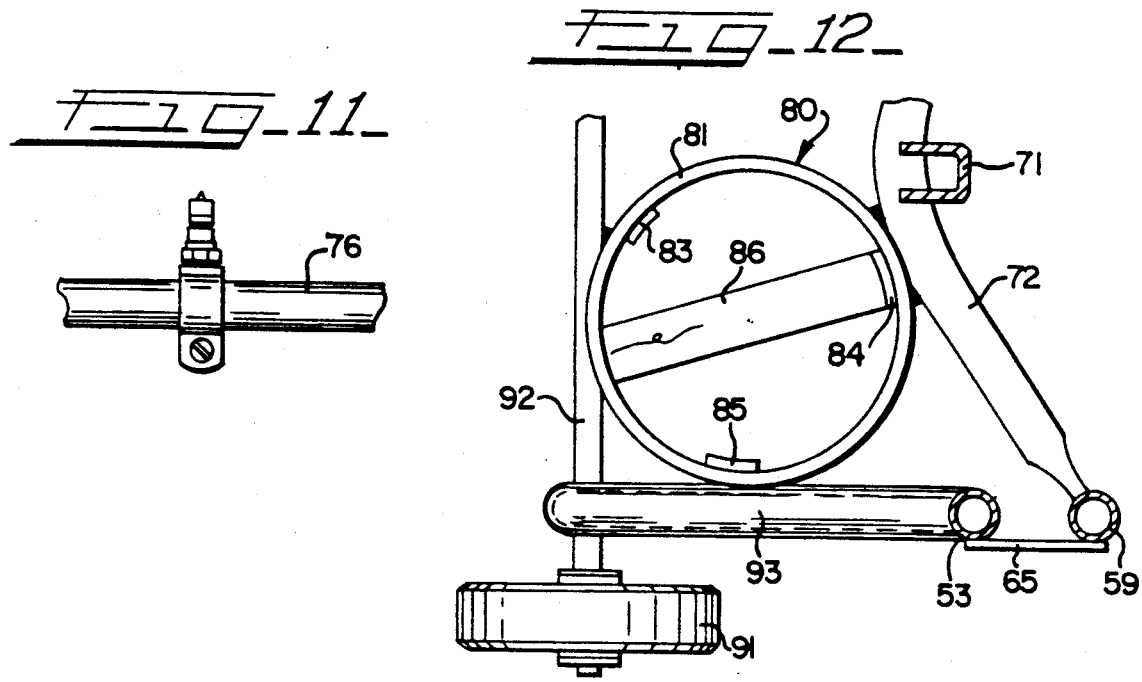
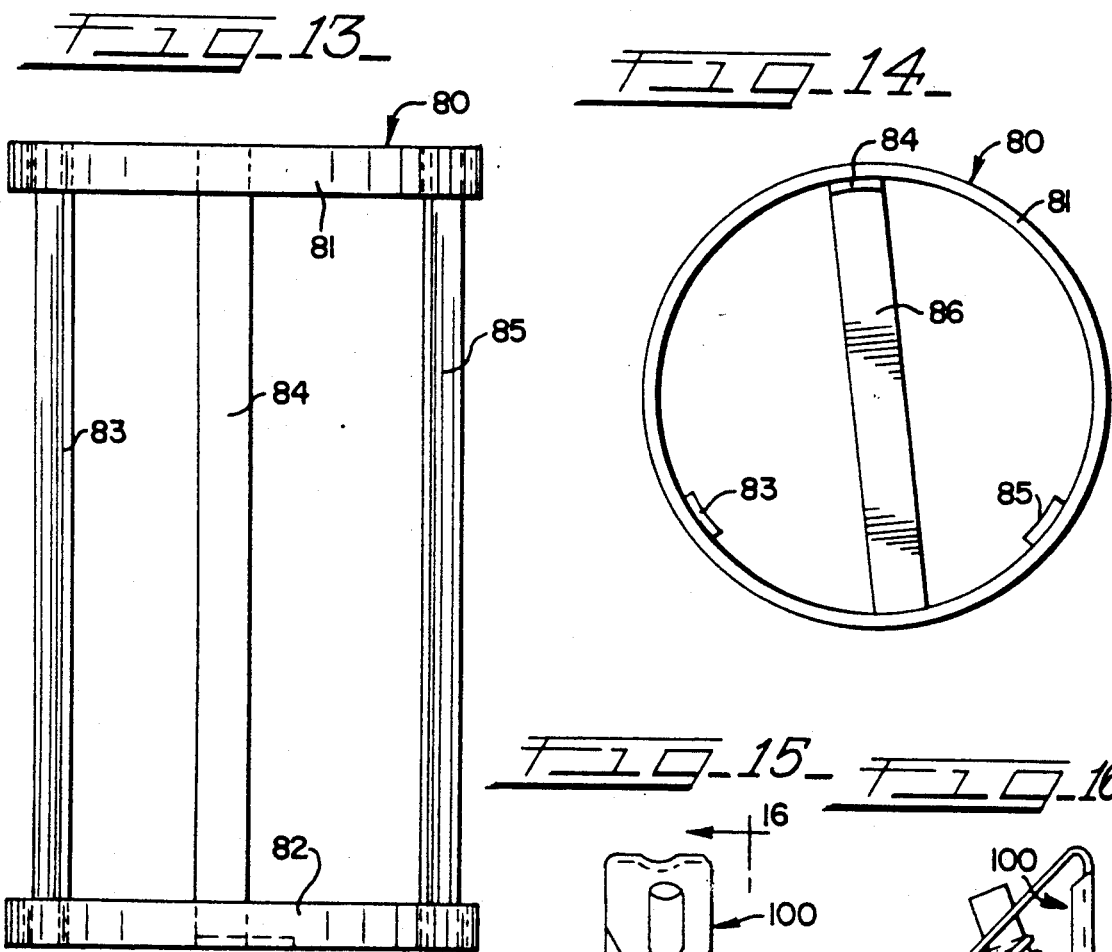
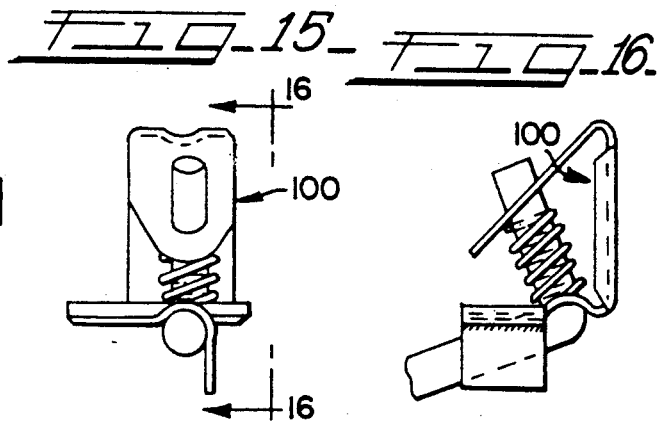

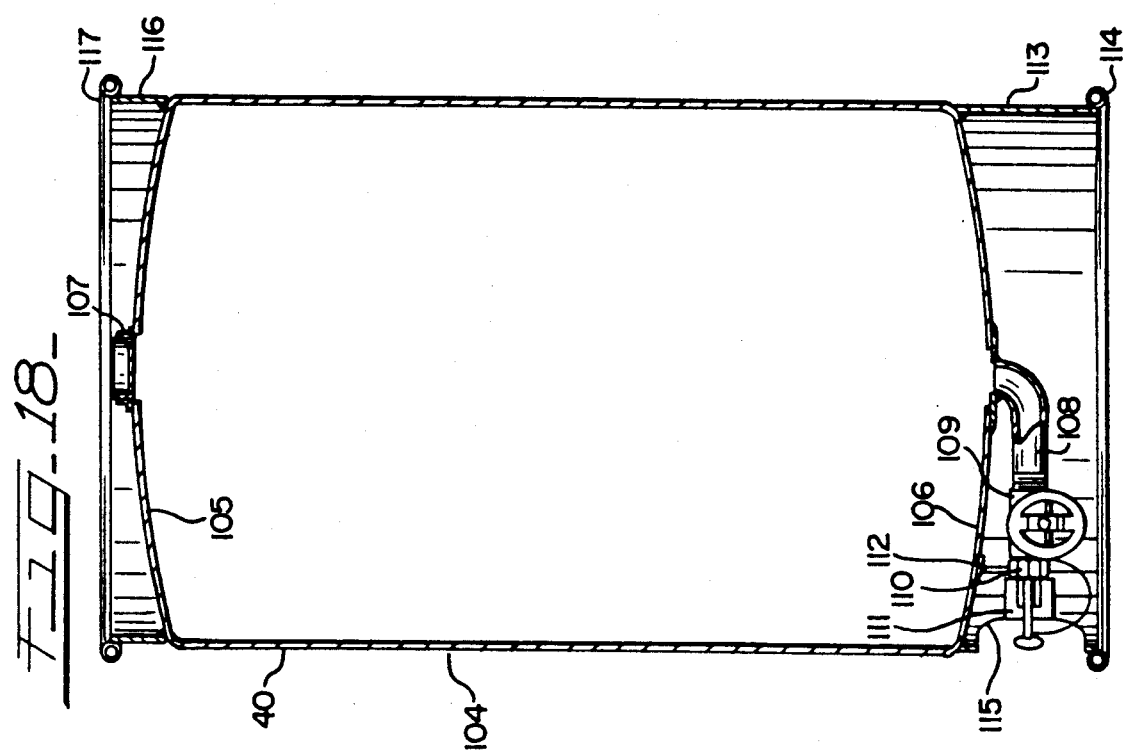
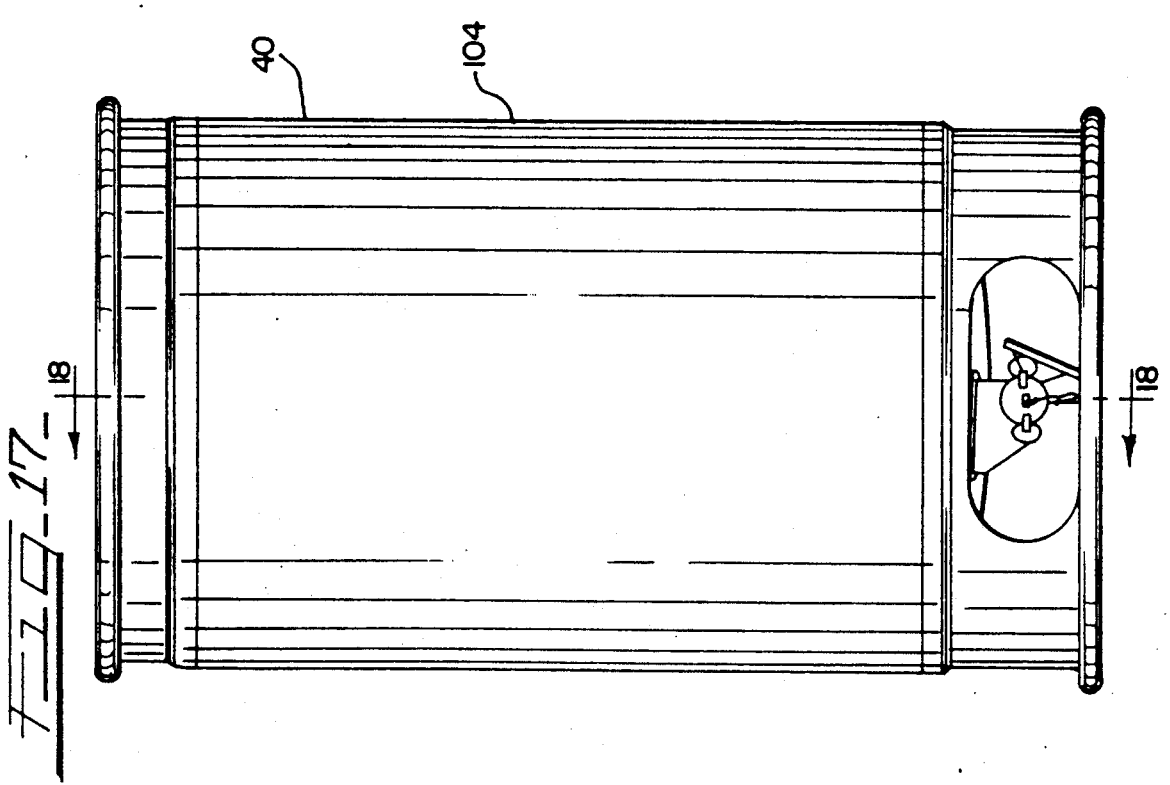

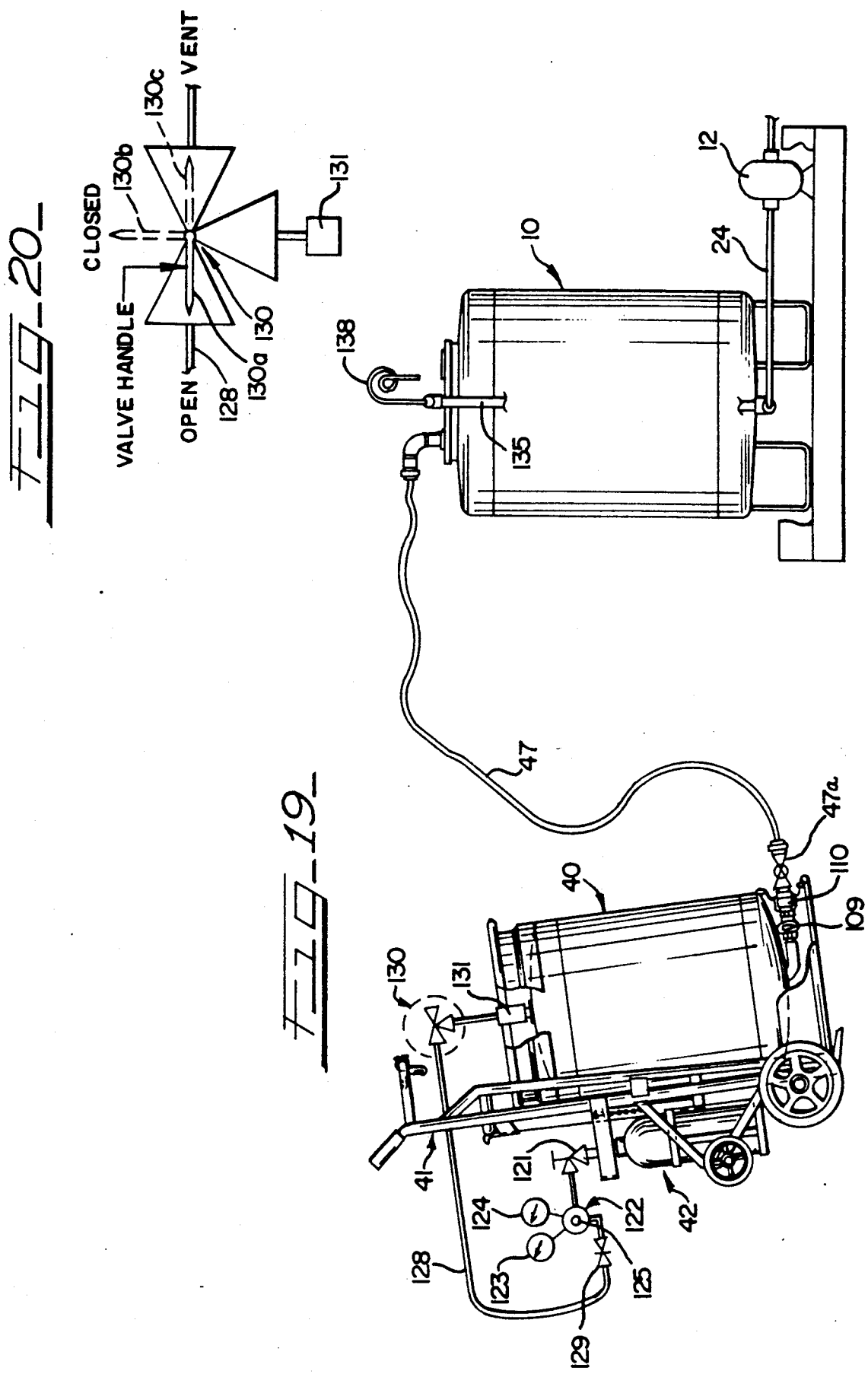

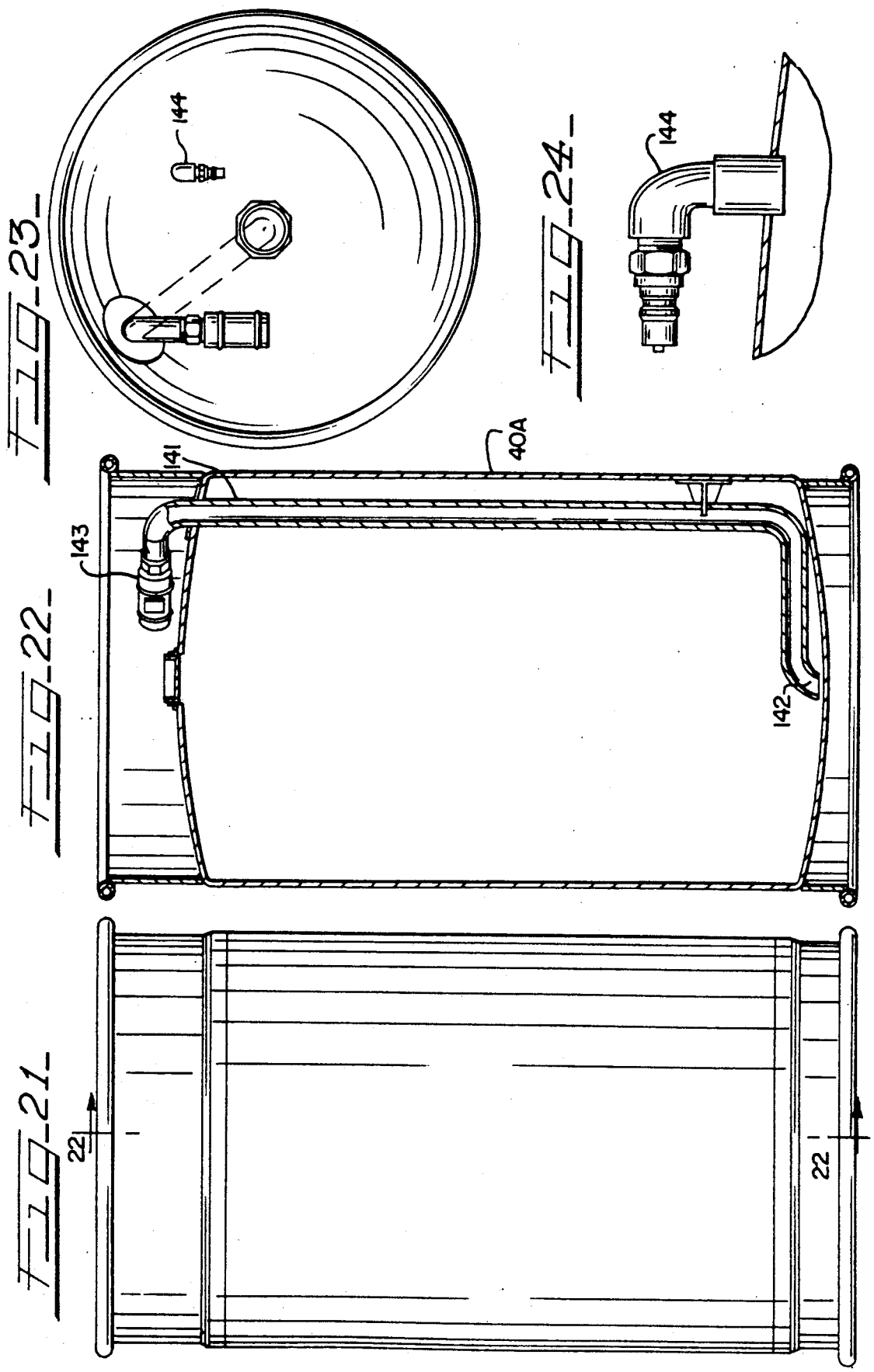

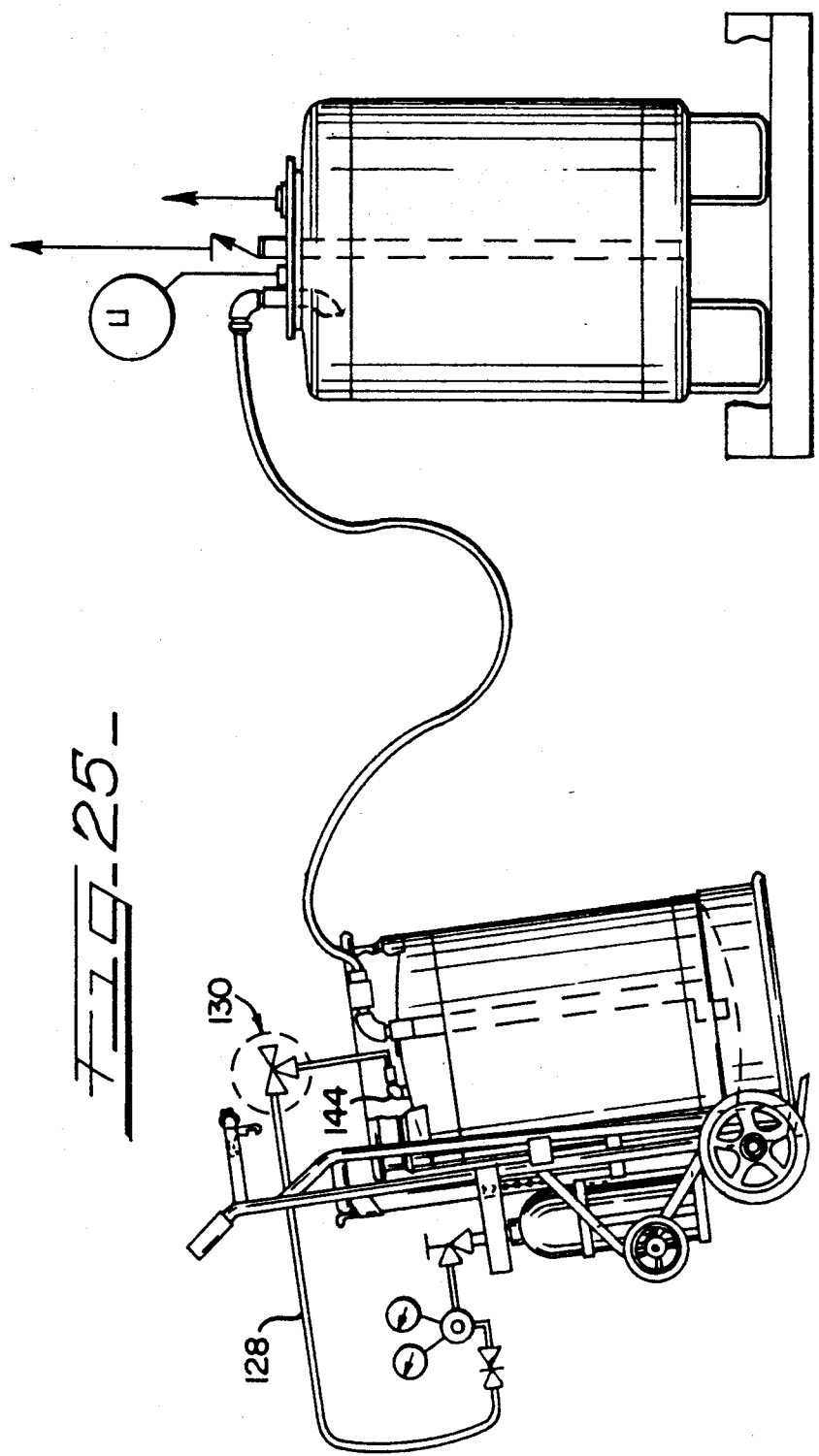

AUTOMATED CHEMICAL STORAGE AND CHEMICAL FEED SYSTEM

This is a continuation-in-part of our copending application Ser. No. 07/385,989, filed July 21, 1989, which is a continuation of Ser. No. 07/223,682, filed July 25, 1988, now abandoned.

This invention relates in general to an automated chemical storage and chemical feed system for monitoring the chemical supply at the use station from a remote supply station to determine the need for supplementing the chemical supply at the use station, and more particularly to a monitoring system having a unit at the use station for monitoring the chemical supply and chemical condition of a process and transmitting information by telemetry to a unit at the supply station of the chemical supply company for readout, and still more particularly to a unique hand truck for transporting and handling a refill tank and a method of using the truck and carrying out the transfer of chemical product from the refill tank to the base tank.

BACKGROUND OF THE INVENTION

Processes run by users/customers who require chemical additives/product must have a chemical supply stored at the process site where the process is being run and means for feeding the chemical into the process. For example, water-cooling towers that depend upon water for thermal conduction require chemical additives in the water in order to minimize corrosion of the equipment handling the water. Depending upon the chemical condition of the water, one or more chemicals may need to be added continuously or intermittently in order to produce the best possible results.

Heretofore, it has been customary to merely use a base supply tank at the use station for storing chemical and to intermittently or continuously feed the chemical into the water or liquid stream of the process, and provide one or more auxiliary refill tanks maintained on hand for refilling the base tank. The refill tanks, when empty, are then exchanged for other refill tanks shipped to the use station. Thus, an extra supply must always be maintained in inventory at the use station. Systems are used on site to determine the chemical condition of the water so that the proper feed of chemicals from one or more base tanks can provide the best treatment of the water for the process. When the base supply tanks are empty, they have been previously refilled if they are determined to be empty at the appropriate time either by the process workers or by personnel from the chemical supplier. Reliance on either has not been reliable, which then places the process in jeopardy and is costly to the user since the equipment condition deteriorates faster and the efficiency of the process is decreased. Further, there is always the chance of human error creeping into the ordering process for replenishment of the chemical supply. When improper control of the feed of chemicals to the process is encountered, such can cause use of excess chemicals, which is more costly to the user. Carrying an inventory of chemicals is also costly.

SUMMARY OF THE INVENTION

The present invention overcomes the difficulties heretofore encountered in maintaining efficient, accurate and reliable operation of a process, such as water treatment in a cooling system. It should be appreciated that chemical treatment of other processes can also be achieved by the present invention. Additionally, human error is substantially eliminated as to feed rate and ordering of replenishing chemicals, and inventory costs are minimized.

The present invention constitutes an automated chemical storage and chemical feed system where monitoring of the process needs at a use station, the site where a process is run, is accomplished at a remotely located supply station that may be many, many miles from the use station. When the supply station determines that adjustment in the chemical feed process is needed, that can be done by suitable controls at the supply station. Likewise, when it is determined at the supply station that the supply of chemical at the use station needs replenishing, an automatic order is placed to have delivered at the most opportune time additional chemical for reloading the chemical storage tank at the use station. A refill tank is shipped to the use station, and of a unique construction so it can be easily handled by a worker at ground level with a hand truck, and completely emptied into the base tank.

The present invention provides in one form apparatus at the use station including a base supply tank for storing chemical and having an outlet connected to the process needing the chemical. A suitable feed pump is provided for periodically or continuously feeding chemical from the storage tank to the process needing the chemical. A level sensor is provided in the base tank for sensing the level of chemical in the tank to measure the contents. The measurement information is delivered to a control unit that may have a microprocessor or other suitable control which then processes the information and delivers a signal to a telemetry system that in turn sends the information to a receiver at the supply station. Apparatus at the supply station decodes the information and records and/or provides it in readout form. The person monitoring this information at the supply station then can determine when there is a need to replenish the supply of chemical in the base tank and, at that time, automatically order a replenishing supply to be delivered to the use station in a portable tank that can be easily hand-trucked to the base tank. The chemical is forced out of the portable tank into the base tank by a suitable gas to complete the replenishing process and then the portable tank is returned to the supply station to be reloaded or refilled.

Additionally, the equipment at the use station may include sensors in the process to measure the chemical condition of the process and provide that information to a control and processing unit which is then in turn sent by telemetry to the supply station for the person to monitor and determine whether there is a need to adjust the feed of chemical to the process. Additionally, the sensing of the feed flow from the base tank to the process can be connected to the control and processing unit and delivered to the supply station for consideration. Controls may be provided at the supply station for adjusting the feed flow of a chemical in order to maintain the process at its optimum chemically treated condition. This eliminates the need for a worker at the use station to monitor the process, thereby minimizing the expense of treating the process.

Heretofore, sales personnel from the chemical supply company have periodically gone to the use station to monitor the supply of chemical. The present invention eliminates that necessity and frees up the sales personnel to handle other duties. More importantly, it removes the human error from the human monitoring of the supply of the chemical at the use station, thereby making the overall process needing the chemical more reliable to provide optimum performance of the process. By monitoring the process, the feed rate can be controlled to match the process requirements, thereby conserving use of chemicals.

The portable tanks used to refill the base tanks are unique in that they have a bottom discharge at the bottom wall which is dished toward the discharge, and are provided with a supply of gas to be introduced in the top of the tank to pressure unload the tank and provide clean and complete emptying of the chemical in the tank so it can be returned to the chemical supply company for refilling. By complete emptying, hazards from spilled chemical are also eliminated, making the refilling and tank handling operation safer. Additionally, complete emptying maximizes the useful product delivered to the user and decreases the waste cost to the user/customer and/or to the chemical supplier. Conventional containers leave one to about seven percent that constitutes waste.

A specially constructed hand truck is provided to transfer a portable refill tank from a vehicle to the site of a base tank for refilling the base tank. Together the hand truck and portable refill tank constitutes a transporter which is particularly constructed so that one person can easily and safely transfer contents from a refill tank into a base tank. The hand truck is constructed to not only receive the refill tank but also to receive a tank of pressurized gas used for unloading the refill tank, together with equipment for controlling the pressurization of the refill tank during the unloading process and the loading of the base tank. Accordingly, the hand truck is constructed so that it can take different positions during connection to the base tank and the unloading step. Further, a regimented method of handling the hand truck and transferring the product from the refill tank to the base tank is unique.

It is therefore an object of the invention to provide a chemical storage and chemical feed system that monitors the chemical supply station from a remote supply station to enable automatic ordering of a replenishment of a supply of chemical, thereby eliminating human error in the ordering process, and also eliminating the possibility of running the process at the use station without chemicals.

Another object of the present invention is in providing an apparatus for remotely monitoring the quantity of chemical supply for a process at a use station so that sales personnel from the chemical supply company can be relieved of the manual monitoring of the supply at the use station and free up their time for more productive sales duties.

A still further object of the present invention is in the provision of a chemical storage and treatment monitoring system that monitors the chemical feed to a process from a remotely located chemical supply station where the feed rate of the chemical to the process can be adjusted to match the process requirements, thereby conserving the use of chemicals.

Another object of the present invention is to provide an automated chemical storage and feed system for a process run at a use station which materially minimizes inventory costs for the customer/user.

It is a further object of the present invention to provide a portable chemical container in the form of a tank having a bottom outlet and a sealable pressure fitting at the top connectable to a supply of pressurized gas for pressure emptying the contents of the tank into a storage tank so as to completely clean and empty the tank, whereby it can be returned to the bulk station for filling, whereby safer handling is achieved, and whereby more useful product is delivered to the user, while at the same time decreasing the waste cost to the user and/or the chemical supplier.

A further object of the present invention is to provide a specially constructed hand truck for handling and transporting a refill tank to a base tank from a vehicle and also to facilitate the unloading of the refill tank.

Another object of the invention is to provide a method for handling a refill tank safely to transfer the contents of the refill tank into a base tank.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 3 is a diagrammatic view of a truck at the supply station being loaded with portable tanks of chemical for shipment to use stations;

FIG. 4 is a diagrammatic view of a truck with portable tanks and illustrating removal of the tanks from the truck to be delivered to the use station wherein the chemical in the tanks will be removed and transferred to a base tank;

FIG. 5 is a diagrammatic view of a person handling one of the portable chemical refill tanks used to refill a base tank and illustrating that the tank is sized so that it can easily be transported at the process site on a hand truck and maneuvered through relatively standard size doorways;

FIG. 6 is a diagrammatic view of the worker unloading the portable refill tank by discharging its contents into the tank at the area where the process is treated with the chemical from the base tank and illustrating the manner of completely emptying the portable refill tank;

FIG. 7 is an upright perspective view of the hand truck of the invention with a refill tank loaded thereon but with other parts omitted for purposes of clarity and illustrating the truck and tank in the upright standing position for unloading of the tank;

FIG. 8 is a side elevational view of the hand truck of the invention with the refill tank loaded thereon and also a pressurizing gas tank loaded and illustrating the manner in which a person would drive the hand truck during conveying of the truck and tank from a vehicle to a base tank, and particularly showing the truck and tank in solid lines in the transport mode and in phantom in the upright position and also the tipped position for facilitating the unloading of the refill tank;

FIG. 9 is a side elevational view of the hand truck;

FIG. 10 is a rear elevational view of the hand truck;

FIG. 11 is an enlarged detailed elevational view and partially fragmentary to illustrate the attachment for carrying the regulator mechanism for controlling the transfer of pressurized gas from the gas tank to the refill tank during unloading of the refill tank and taken substantially along line 11—11 of FIG. 10;

FIG. 12 is a greatly enlarged fragmentary detailed view showing the cage for receiving the pressurized gas tank and taken substantially along line 12—12 of FIG. looking in the direction of the arrows;

FIG. 13 is an enlarged vertical side elevational view of the cage used for receiving the pressurized gas tank;

FIG. 14 is a top plan view of the cage of FIG. 13;

FIG. 15 is an enlarged bottom plan view of the kickstand at the base of the hand truck and taken substantially along line 15—15 of FIG. 10 and looking in the direction of the arrows;

FIG. 16 is a side elevational view of the kickstand and taken substantially along line 16—16 of FIG. 15 and looking in the direction of the arrows;

FIG. 17 is a vertical elevational view of the refill tank having a bottom discharge;

FIG. 18 is a sectional view of the tank of FIG. 17 taken substantially along line 18—18 thereof;

FIG. 19 is a side elevational view of the refill tank on the hand truck together with the pressurized gas tank and showing the interconnections for pressurizing the refill tank unloading thereof and also showing a line interconnected between the bottom discharge outlet of the refill tank and the base tank;

FIG. 20 is a schematic view of the valve employed between the refill tank and the line going to the regulator of the pressurized gas tank;

FIG. 21 is a vertical sectional view of a refill tank having a top discharge outlet;

FIG. 22 is a vertical sectional view of the tank of FIG. 21 taken substantially along line 22—22 of FIG. 21;

FIG. 23 is a top plan view of the tank of FIGS. 21 and 22;

FIG. 24 is an enlarged elevational view of the fitting for the tank of FIGS. 21 and 22 that receives the pressurized gas line; and FIG. 25 is a view similar to FIG. 19 but illustrating the manner in which the top discharge refill tank of FIGS. 21 and 22 would be unloaded into the base tank.

DESCRIPTION OF THE INVENTION

The automatic chemical storage and chemical feed system of the present invention is illustrated as having a single base tank for feeding a single chemical to a process for chemical treatment of the process, and it will be appreciated that any number of base tanks may be used with different chemicals for treating a process. Indeed, there are some processes which require treatment by more than one chemical in order to make the process run efficiently.

Figure 1:
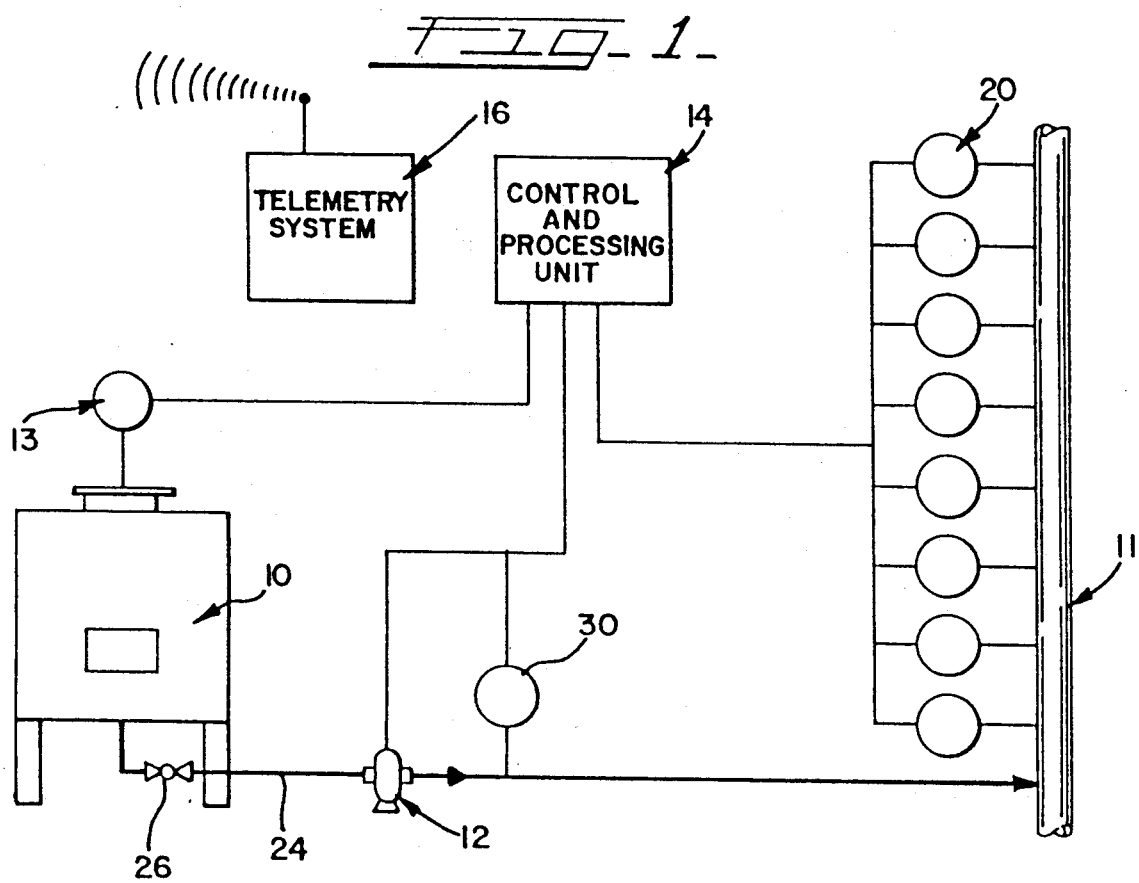
FIG. 1 is a schematic view of a use station apparatus for monitoring the level of chemicals in a storage tank and sensing chemical condition of the process and the flow of chemical being fed to the process, which information is inputted to a telemetry system for sending to a remote supply station for processing.

Referring now to the drawings, and particularly to FIG. 1, there is illustrated equipment provided at the use station where the process is being run for sensing and processing data to be transmitted by a telemetry system to a supply and monitoring station. This equipment generally includes a base tank 10 for storing chemical to be fed to the process 11 by a feed pump 12, a chemical level sensor 13 for sensing the level of the chemical in the tank 10, a control and processing unit 14 for processing information from the feed system, and a telemetry system 16 for transmitting the information from the processing unit to a supply station remotely located from the use station. Additionally, one or more sensors 20 may be provided for the process to sense the chemical condition of the process and then interconnected with the control and processing unit for delivering that information to the processing unit.

The base tank 10, as more particularly seen in FIG. 6, includes a downwardly dished bottom 22 which facilitates the gravitational movement of the liquid into a bottom outlet 23 that is connected to a feed line 24 and being in turn connected to the process 11, as shown in FIG. 1. A cover 25 is provided at the top end of the tank with any number of fittings for purposes of filling the tank from the top, venting the tank, and also the insertion of a device for sensing the level of chemical in the tank in the form of the level sensor 13 shown schematically in FIG. 1. The base tank 10 may be of cylindrical or cube shape as desired and will have a capacity normally in the neighborhood of 70 to 80 gallons. Tanks of higher or lower capacity may be provided as dictated by the needs of the user. As seen in FIG. 1, an on-off valve 26 may be provided in the feed line 24.

The level sensor may be of any suitable type which would provide an electrical signal in proportion to the level of chemical in the tank and which could then be translated to a quantity value. For example, an electrically responsive level sensing device may be used of the type disclosed in U.S. Pat. No. 4,169,377, owned by Nalco Chemical Company.

While eight sensors 20 are shown for sensing the chemical condition of the process 11 which would in most instances be a liquid system for handling thermal transfer, it will be appreciated that the use of such sensors is optional. Such sensors will provide a more accurate understanding of the chemical condition of the process in order to more reliably and accurately treat the process for optimum performance. The sensors would also be electrically responsive. For example, the flow of the liquid system in the process could be sensed in addition to PH, magnesium content, calcium content, and others, providing information to the person monitoring the process to assist in properly chemically treating the process.

A flow rate sensor 30 may also be provided in the feed line 24 in order to measure the flow rate in that line.

The control and processing unit 14 would include a suitable microprocessor for handling and processing the data received from the level sensor, the process and the feed flow in order to process the information for transmittal through the telemetry system 16 which is connected to it. Each of the sensors in the process is connected to the control and processing unit 14 as is the sensor for measuring flow of chemical in the chemical feed line 24. Additionally, the level sensor is connected to the control and processing unit. Finally, a control line for the feed pump 12 is connected to the control and processing unit so that the feed pump may be adjusted to provide the desired feed of chemical from the storage tank 10 to the process.

The telemetry system 16 may be of any suitable type in order to be able to transmit the information from the control and processing unit to a supply station that may be remotely located from the use station and in some cases many miles away. For example, the telemetry system may transmit the information by use of radio equipment or telephone lines. Also, the system would be optionally capable of receiving signals from the supply station to adjust the feed flow rate.

Figure 2:
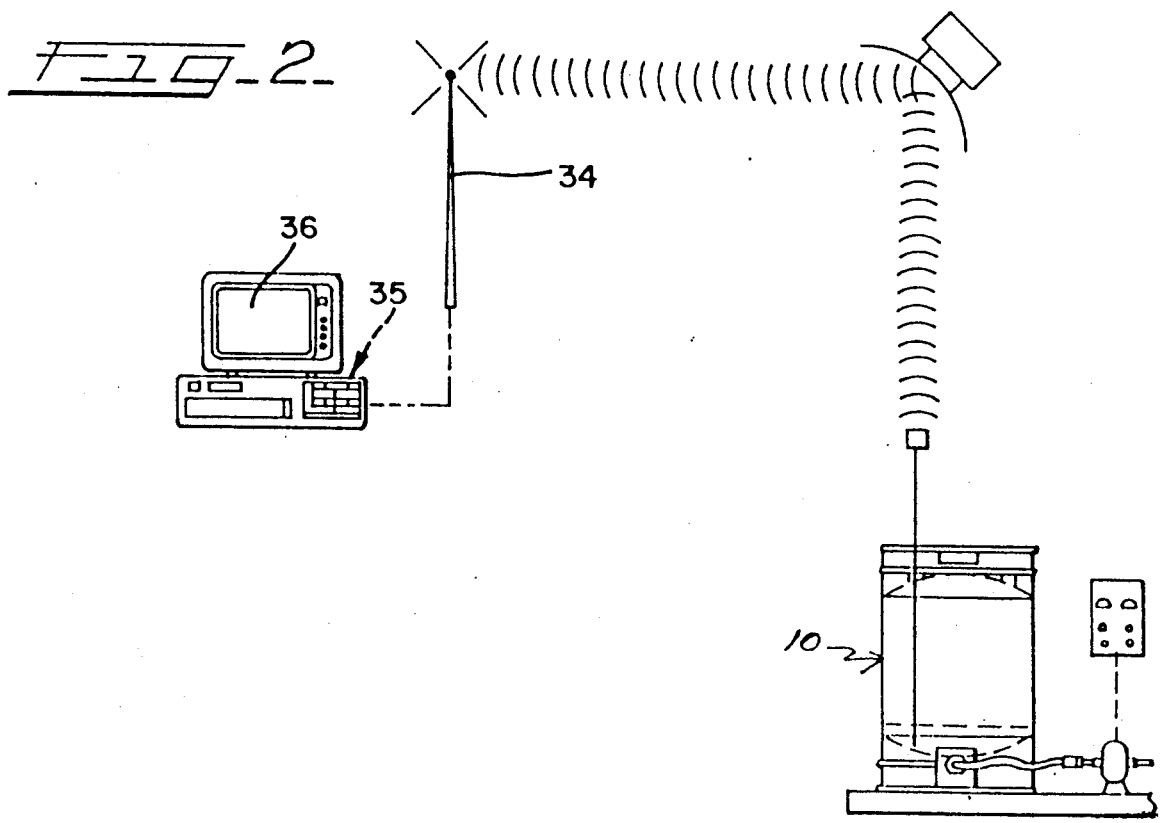
FIG. 2 is a schematic view of a base tank at the use station and the monitoring equipment at the supply station and illustrating that the information is transmitted from the use station to the supply station.

The signal or signals from the telemetry system at the use station are received by an antenna if radio telemetry is used, as seen by the antenna 34 in FIG. 2, which would be located at the supply station. This antenna is connected to a computer 35 having a suitable video display terminal 36. The computer 35 would process the data and provide a readout on the video display terminal for the person monitoring the system. It should be appreciated that the computer at the supply station would be set up to monitor any number of use stations. Further, it should be appreciated that a printer could be provided for printing the information processed by the computer.

Once the person at the supply or base station determines from the computer display terminal that the quantity of chemical in the base tank at any particular use station is at a level where it will need replenishing so that the supply will not be exhausted leaving the process to run without the chemical, an order will be immediately set up by the person to deliver a tank of chemical to the use station for replenishing the supply of chemical in the base tank. For purposes of alerting the operator as to the need for a replenishing supply, the computer may be programmed to provide not only a visual indication but also a sound indication. This order will result in loading of one or more tanks 40 of chemical onto a truck 41 at the supply station. Thereafter, the truck would deliver the tanks to the supply station or stations needing the chemical, as seen in FIG. 4, where the tanks 40 would then be unloaded from the truck to be used at the supply station.

Thereafter, a worker would normally manually transport the refilled tank 40 to the site of the base tank 10. The refilled tanks 40 are of a smaller size than the base tanks, such as having a capacity of about 50 gallons, and they are sized so that they may be easily handled by a hand truck such as illustrated by the hand truck 41 in FIG. 5 and be moved through a standard three-foot-wide door opening. The truck would also include a cylinder of gas 42 to be used in the unloading of the portable refill tank.

Referring now to FIG. 6, it will be seen that the refill tank 40 includes a dish-shaped bottom 45 and an outlet 45a at the lowest point connectable to a discharge line 47 that may then be suitably connected to the top of the base tank 10 for the unloading process. It is also noted that at the location of the base tank the refill tank is brought to an upright position for unloading and the gas cylinder 42 has its outlet end connected by line 46 to a fitting 46a on the cover of the refill tank 40. The chemical in the refill tank is unloaded under gas pressure of about 15 psi in order to completely empty the refill container 40 so that it can be returned to the supply station to be refilled from a bulk container and used again for further refill purposes. By being completely empty, no possible accidental spill can then occur, making it safer to handle. Any suitable gas may be used for the cylinder 42, such as nitrogen.

It will now be appreciated that the structure of the refill tank 40, together with the system of emptying the tank, results in delivering more useful product to the user by complete emptying of the tank and eliminating waste cost of product to the user and the chemical supplier. Further, the chemical supplier is not burdened by the additional cost of cleaning the tank before refilling with product. The overall efficiencies therefore benefit both the user and the chemical supplier.

Once the refill tank 40 has been emptied, the fill line 47 is removed, and it will be considered that the base tank 40 has been replenished with chemical prior to being exhausted of its contents. This cycle of refilling will be repeated as often as needed and will not depend upon any workers at the use station for monitoring the contents of the base tank. Thus, inventory costs will be minimized and more reliable monitoring of the contents of the base tank will be achieved in order to eliminate the risk of leaving the process run without the use of a chemical.

It should also be appreciated that the feed pump may be run at a constant speed, and an adjustable flow control valve could be provided in the feed line, and be controlled by the controls at the supply station to regulate the chemical feed flow to the process.

Use of the control and processing unit for not only monitoring the system but also for controlling the operation of the feed pump and therefore the flow of chemical to the process will reduce chemical usage by reducing or stopping the feed of chemical to the process when the chemical condition of the process is at optimum condition. The control and processing unit will therefore control the feed rate of the chemical to the process to match the process requirements. It may be further appreciated that the safety of the overall system is enhanced and particularly the safety of the handling of the chemical by completely emptying the refill tank into the base tank.

By completely emptying the refill tank, residual chemicals are eliminated. This is beneficial in that more chemicals are provided for use in the process and less chemicals are to be treated and processed as waste. It should be noted that conventional containers leave one to seven percent in the container.

The present invention will eliminate the need for a salesperson to come to the use station for the purpose of monitoring the supply of chemical to the base tank, thereby freeing the salesperson to handle other more productive tasks. It will further be appreciated that this system will eliminate human error in the ordering of a further supply of chemical and eliminate the possibility of running the process without the chemical.

Referring now particularly to FIGS. 7 to 16 that more particularly illustrate the construction of the hand truck 41, it will be appreciated the hand truck not only serves to transport the refill tank 40 and the gas cylinder 42 along with equipment for unloading the refill tank between a transport vehicle and the base tank needing product replenishment to avoid interruption of maintaining the process efficient, but also serves to particularly assist the delivery person in the unloading operation.

The procedure followed is for the delivery person illustrated in phantom in FIG. 8 to transport by road vehicle the refill tanks, a hand truck, nitrogen cylinders, and nitrogen handling equipment from the chemical company's warehouse or distribution plant to the customer or user plant with orders to deliver a particular product or products for particular users. At the user's site the delivery person will load onto the hand truck 41 the particular refill tank having the contents to be delivered and a gas cylinder which would normally include nitrogen but could have any other suitable pressurized gas along with the equipment needed to interconnect the gas cylinder to the refill tank and control gas flow for unloading product from the refill tank. The delivery person will then wheel the transporter which includes the truck and the refill tank together with its equipment from the vehicle into the plant and to the site of the base tank. During wheeling operation, the hand truck takes the position shown in solid lines in FIG. 8.

In order to better understand the operation of the hand truck, its structure will now be described.

The hand truck includes an axle 50 having running wheels 51 suitably mounted on opposite ends. Suitably secured to the axle 50 and upstanding therefrom are vertical frame bars 52 and 53 terminating upwardly in handles 54 and 55, respectively. It will be appreciated that the frame bars 52 and 53 and the handles would be made of a suitable tubular steel. It can also be seen that the tubular frame bars 52 and 53, near their upper ends, are bent apart to space the handles 54 and 55 wider than the bars 52 and 53 for stability purposes in handling the truck during transporting of the refill tank and nitrogen cylinder. At the front side of the frame bars 52 and 53, upstanding container stabilizing bars 59 and 60 are spaced forwardly of the main frame bars 52 and 53 and suitably connected to the main frame bars to assist in defining a cradle for receiving the refill tank. The upper ends of the stabilizing bars 59 and 60 are suitably secured such as by welding to the upper ends of the main frame bars 52 and 53 at 61 and 62. Approximately midway between the upper and lower ends of the stabilizing bars 59 and 60 are connecting plates 63 and 64, which are suitably welded at opposite ends respectively to the frame bars and the stabilizing bars, as particularly shown in FIGS. 9 and 10. Further connecting plates 65 and 66 are provided near the lower ends of the bars to further interconnect the frame bars to the stabilizing bars. At the very lower ends of the bars and connecting to both ends of both bars at each side are lifting tines 67 and 68 which engage the bottom of a refill tank to assist in the handling of the refill tank and as particularly illustrated in FIG. 8. Completing the cradle for receiving the refill tank on the truck there is a vertical rear channel member 71, against which a refill tank is supported, extending centrally between the frame bars and the stabilizing bars and disposed slightly behind the frame bars 53. This channel is connected at its lower end to a tubular bar 72 secured at opposite ends to the stabilizing bars 59 and 60. The tubular bar 72 is somewhat U-shaped and a further U-shaped tubular bar 73, to which the channel is connected, is provided at the upper end of the channel 71 and also connected at opposite ends to the stabilizing bars 59 and 60. Preferably, these connections are in the form of welds in order to provide a rigid overall structure for the hand truck.

A lower U-shaped tubular bar 74 is connected near the lower ends of the stabilizing bars 59 and 60 for further strengthening the hand truck and particularly the relationship between the stabilizing bars.

In order to maintain the proper spacing of the frame bars 52 and 53 in parallel relation near most of their length, a U-shaped metal plate 75 has its free ends suitably secured such as by welding to the outside surfaces of the frame bars 52 and 53 substantially midway between the upper and lower ends of the frame bars. Additionally, at the handles 54 and 55, a forwardly extending tubular U-shaped member 76 is provided and which is also suitably welded to the upper ends of the frame bars 52 and 53 at the base of the handles 54 and 55.

A cage 80 is provided to carry the gas cylinder 42 and is suitably secured near the lower end of the hand truck and at one side. The cage includes upper and lower annular rings 81 and 82 interconnected by vertical struts 83, 84 and 85. At the lower end of the cage a cross strut 86 defines the bottom of the cage and on which the cylinder will rest when placed on the cage. The cage is connected to the truck frame by welding a part of vertical strut 84 to the U-shaped tubular bar 72 and further as described below. As described below, a chain connected to the truck functions to hold the cylinder in the cage. It will be appreciated that the strap may be provided in lieu of the chain.

In order to situate the hand truck with the refill tank in a position to connect the loading line of the base tank, the hand truck includes a second set of wheels 91 mounted on a shaft 92 that is secured to a pair of V-shaped tubular bars 93 and 94 connected to the backside of the hand truck. The bars 93 and 94 are connected to the main frame bars 52 and 53 just above the main wheels 51, as seen in FIGS. 9 and 10, which dispose the wheels such that when the truck with the refill tank mounted thereon is tipped so that the wheels 91 and 92 engage the floor as noted in phantom in FIG. 8, the refill tank 40 will be tipped backwardly and the lower end of the refill tank will be elevated above the floor to a point for facilitating the interconnection of the loading line of the base tank with the bottom discharge outlet of the refill tank by the delivery person. It will be further noted in FIG. 12 that the cage 80 is additionally connected to the framework for supporting the wheels 91 in order to assure proper support of the cage relative to the hand truck.

Thus, as seen in FIG. 8, during the handling of the refill tank, the truck with the tank thereon may take one of three different positions. First, it may be in the position shown in solid lines where the delivery person is moving the truck with the refill tank thereon from one location to another and having the truck supported only on the wheels 51. Secondly, the truck may be in the upright position as shown in phantom and designated 40u for unloading into the base tank. Finally, the third position is when the tank and truck are tilted until all four wheels engage the floor as also shown in dotted lines in FIG. 8, as indicated by the numeral 40d for purposes of connecting and disconnecting the transfer line and for operating the refill tank discharge valve.

In order to further assure that the refill tank is held in position on the truck, a strap 95 is provided around the tank and suitably connected to the front stabilizing bars 59 and 60 with a suitable buckle for opening and closing the strap about a refill tank. Also, a hook may be provided at the top of the channel 71 for hooking onto the upper lip of the tank for additionally holding the tank on the hand truck. A length of chain 96 is connected to the vertical channel 71 and may be trained about the top of the gas cylinder, as shown in FIG. 8, and locked in place.

In order to further stabilize the truck and tank in the upright position during unloading of the refill tank, a kickstand 100 is mounted to the main wheel shaft 50 in a suitable manner. The kickstand includes a kick bar 101 that is selectively movable between a non-operative position, as shown in FIG. 10, to an operative position where it can engage the floor, as shown in FIG. 7.

The bottom discharge refill tank 40 is shown in more detail in FIGS. 17 and 18 wherein it includes a main upstanding cylindrical wall 104 forming the side walls of the container and closed at the top by an upper top wall 105 and at the bottom by a lower bottom wall 106.

A bung 107 is provided in the center of the top wall for receiving either a closing plug or for receiving the fitting for attachment of the gas line from the pressurized gas cylinder. At the bottom wall 106, an outlet or discharge pipe 108 connects to an opening in the center of the wall and is provided at one end with a discharge shutoff valve 109 and a fitting 110 that is normally covered by a dust cover 111. The outlet extends to the side of the container to facilitate connection thereto of a transfer line connected to an inlet of the base tank. In order to provide a proper support for the outlet pipe, a hanger 112 interconnects the end fitting to the bottom of the tank. An annular rim 113 extends from the bottom of the tank and is essentially contiguous and a continuation of the side wall 104 and terminates in an annular lip 114. The lip 114 provides a solid bottom member for supporting the refill tank on the floor. The rim 113 protects the outlet pipe and is also provided with an opening 115 at one side to provide access to the fitting 110. Similarly, a rim 116 is provided at the top end of the tank extending upwardly from the side walls and terminating in an annular lip 117 which protects the bung from ever being in engagement with the floor if it is tipped upside down.

A regulator and valving apparatus is provided for obtaining safe transfer of nitrogen from the nitrogen cylinder 42 into the refill tank 40 during the unloading of the refill tank and which includes a main shutoff valve 121 is mounted at the top of the cylinder 42 with an outlet connecting to a line connected to a pressure regulator 122 which includes a line pressure gauge 123 and a tank pressure gauge 124, together with a valve 125 that controls the outlet pressure or the pressure of the gas that is being delivered from the cylinder into the tank. The outlet of the regulator 122 is connected to a line 128 having a needle valve 129, and the line 128 is connected to a three-way valve 130 that is connectable to the bung of the refill tank through a quick disconnect coupling 131. A relief valve may be provided on the regulator. It will be appreciated that a suitable fitting will be connected into the bung before utilizing the quick disconnect coupling 131 on that fitting.

The three-way valve 130, as shown in FIG. 20, is capable of being in one position (open) where it connects the line 128 to the quick disconnect fitting 131 and refill tank, as shown by 130a, a second position (closed), as shown by 130b, where the valve is closed, and a third position (vent) 130c whereby the refill tank is vented.

When making an actual delivery, the delivery person arrives at the customized s or user's plant and first determines if it is possible to make a safe and proper delivery. Usually, three conditions make delivery impossible which would include a situation where the two-wheeled hand truck could not be used, where a stairs or hoist would have to be used in order to make the delivery, and where it would not be possible to move the hand truck with the refill tank within about five feet of the base tank. These conditions do not prevent delivery. The delivery person will note and follow the customer's safety requirements. While at the customer's loading dock, the delivery person will go through a checklist for equipment to bring to the base tank location. A refill tank with the ordered chemical will be loaded onto the hand truck, together with a nitrogen cylinder and equipment for connecting the nitrogen cylinder to the refill tank. Then, the person will transport the hand truck with the refill tank to the base tank. There, the person will check to determine if the proper refill tank has been brought by matching the serial numbers and contents labels appearing both on the base tank and on the refill tank. Next, the delivery person will check the level of chemical in the base tank by looking at the level gauge 135. The gauge will have to indicate that the entire contents of the refill tank can be safely transferred into the base tank. For example, if the base tank holds 75 gallons and it is desired to transfer 55 gallons from the refill tank into the base tank, the base tank must not have more than twenty gallons registering on the level gauge.

If the base tank is empty and not hooked up to the customer's process, the bottom discharge valve on the base tank should be checked to see that it is closed before transferring chemical product from the refill tank into the base tank.

The transfer operation is begun by tipping the hand truck back to the position where all four wheels are engaging the floor so that the outlet fitting 110 is at a level that is easily reached by the delivery person. The bottom shutoff valve 109 must be checked to see if it is closed. Then, the dustcap 111 may be removed so that the transfer line 47 may be connected to the refill tank. The transfer line is already connected to the base tank and provided with a shutoff valve 47a and a quick disconnect coupler that will facilitate coupling to the discharge fitting on the refill tank. After the transfer line 47 is connected, the shutoff valve 109 is opened and the hand truck stood in an upright position 40u for the unloading operation, as seen particularly in FIG. 19.

The delivery person then checks to be sure that the shutoff valve 121 at the top of the nitrogen cylinder is closed. The bungcap at the top of the refill tank is removed and the quick connect fitting is inserted in its place so that the nitrogen line 128 and three-way valve 130 can be connected to this fitting. Before proceeding, it is important to check to see that the vent line 138 of the base tank is open. The curlicue at the top of the level gauge should not be obstructed, kinked or bent, and the open end of the curlicue should be pointed downwardly.

Next, the three-way valve 130 should be checked to be sure that the valve to the nitrogen line 128 is in closed position 130b, again making sure the needle valve 129 in line 128 is closed. The adjusting knob 125 on the regulator 122 should be checked for operation and also turned to closed position.

The delivery person next positions himself so that the cylinder is between him and the regulator. The shutoff valve 121 is opened and then the cylinder pressure will register on the cylinder gauge 124, assuming the tank is full or partially full. Next, the needle valve 129 is opened. The adjusting knob 125 on the regulator should then be turned until the line pressure gauge 123 reads 3 psig. With the transfer hose checked from the base tank to the refill tank, the unloading operation can proceed. The three-way valve 130 may be operated to open between the transport line 128 and the fitting 131 by positioning the valve as shown at 130a to commence product unloading. The product should then be flowing through the transfer line 47 to the base tank. These lines are preferably of clear plastic so that the movement of liquid can be generally observed. When the transfer of the chemical from the refill tank is completed, the nitrogen from the gas cylinder is allowed to continue to flow from the refill tank 40 to blow the lines clean of product. During the unloading operation, the gauge 123 is monitored to maintain a proper pressure in the refill tank. The transfer of product from the refill tank to the base tank should take only about three minutes.

Next, the valve 47a in the transfer line must be closed, and then the valve 121 at the top of the nitrogen cylinder is also closed. The refill tank is then vented by turning the three-way valve to the position 130c, and by watching the pressure gauges, it can be seen that both will fall to zero. Thereafter, the nitrogen line can be removed from the quick connect coupling on the bung of the refill tank and the fitting can be removed so the bungcap can be replaced to close the refill tank. The truck is tipped back so that again all four wheels are engaging the floor. The shutoff valve 109 is closed. While holding the transfer hose so that liquid will flow into the base tank, the transfer hose is removed from the bottom discharge outlet and put back into storage. Thereafter, the refill tank on the hand truck is returned to the truck so that the refill tank can be returned to the chemical supplier for cleaning, if necessary, and refilling. As long as the nitrogen tank is not empty, it can be used for subsequent product transfer operations. When it empties and the tank pressure gauge 124 indicating that pressure in the tank falls below 3 psig, the cylinder is replaced with a full cylinder of gas. Replacing the cylinder requires closing of the three-way valve 130, closing of the needle valve 129 and the nitrogen cylinder valve 121, turning of the adjusting knob on the regulator to shutoff position, and disconnecting the regulator from the nitrogen cylinder. The first procedure above described is used when a full nitrogen cylinder is substituted.

For some deliveries, a refill tank having a top discharge outlet will be used particularly for handling of certain hazardous chemicals to avoid accidental spills on the floor. Such a top discharge refill tank is shown in FIGS. 21 to 24 and illustrated in use in FIG. 25.

The top discharge tank differs from the refill tank 40 only in that it includes a top discharge outlet and such a tank generally designated by the numeral 40a is shown which includes a pipe 141 extending vertically through the tank with an inlet 142 at the bottom end of the pipe situated at the center of the tank near the bottom wall. Coming out through the top wall of the tank, the pipe has provided thereon a fitting 143 of the quick connect and disconnect type to which the transfer hose or line to the base tank is connectable. The tank also includes a nitrogen inlet 144 to which the nitrogen line 128 with the three-way valve 130 may be connected. The fitting 143 has a valve which is closed until the transport line is connected to it. Otherwise, the transfer procedure is essentially the same for both refill tanks.

From the foregoing, it will be appreciated that the system of monitoring the level of a base tank from a off-site location and placing orders for product replenishment when needed, together with the delivery of the refill tank with the desired product to the customer's plant and then transferred to the base tank, eliminates the customer from handling the chemical product in any way. Further, the empty refill tank is returned to the truck and to the chemical supplier and then cleaned, if necessary, and refilled with product for future deliver. This completely eliminates the need for a customer to inventory a replenishing supply in refill tanks or drums and the problem of handling such tank or drums.

It will be understood that modifications and variations may be effected without departing from the scope of the novel concepts of the present invention, but it is understood that this application is to be limited only by the scope of the appended claims.

We claim:

1. A hand truck for transporting a cylindrically shaped refill tank of about fifty gallon capacity filled with a chemical product and for unloading the product into a stationary base tank, said refill tank having a discharge means at the bottom of the tank, said hand truck also having means for transporting a nitrogen cylinder for pressurizing the refill tank during unloading and transfer of product to the base tank, and equipment to interconnect the nitrogen cylinder and refill tank and control the pressurizing of the refill tank during transfer, said hand truck including a generally upright elongated frame having upper and lower ends, a front side and a back side, running wheels mounted on the lower end for supporting the truck and allowing it to be wheeled along a generally flat surface, handle means at the upper end of the frame, lifting means on the lower end of the frame at the front side for engaging the bottom of a refill tank, means intermediate the upper and lower end of the frame for selectively securing the refill tank to the frame, a cage at the back side of the frame for receiving a nitrogen cylinder used to unload the product from the refill tank, nitrogen connection and control means connecting the nitrogen cylinder to the refill tank and controlling the pressure of nitrogen in the refill tank, and means coacting with the running wheels to position the truck and refill tank and elevate the bottom of the tank to facilitate connection of a transfer line from the base tank to the discharge means of the refill tank.

2. The hand truck of claim 4, wherein the nitrogen connection and control means includes a pressure regulator for controlling the level of nitrogen pressure, and a three-way valve for selectively connecting the outlet of the regulator to the refill tank or venting the refill tank.

3. The hand truck of claim 1, wherein said means coacting with the running wheels to elevate the bottom of the refill tank includes a second set of wheels mounted on the back side of the frame.

4. The hand truck of claim 3, which further includes a kickstand at the lower end for assisting in the stability of the truck and refill tank in an upright position during unloading of the refill tank product.

5. A hand truck for transporting a generally elongated cylindrically shaped refill tank holding a chemical product along a floor and unloading the refill tank product into a stationary base tank, said refill tank having a discharge means in the bottom of the tank, said hand truck including an elongated frame having an upper end and a lower end and a front side and a back side, running wheels mounted at the lower end of the frame, handle means at the upper end of the frame, lifting means at the lower end of the frame at the front side on which an edge of the bottom of the refill tank is received, the tank being disposed in an upright position on the frame, stabilizing bars at the front side to stabilize the refill tank against lateral movement on the truck, a cage secured at the back side for receiving a pressurized gas cylinder used for unloading the product from the refill tank, a second set of wheels at the backside of the frame disposed to coact with the running wheels to tip the truck back to a position of rest that will dispose the tank at an actue angle to the floor and elevate the front bottom of the refill tank to provide ready access to the bottom of the tank for facilitating connection of the discharge means of the refill tank to a transfer line, and a kickstand at the lower end for assisting in stabilization f the truck and refill tank in an upright position during unloading of the refill tank product, whereby the truck may be disposed in an upright position with the kickstand when unloading the refill tank, a position tilted from the upright position for wheeling the truck on the running wheels, and a position back from the wheeling position on the second set of wheels together with the running wheels to allow full access to the bottom of the refill tank.

* * * * *

UNITED STATES PATENT AND TRADEMARK OFFICE
CERTIFICATE OF CORRECTION

PATENT NO. : 5,029,602

DATED : July 9, 1991

INVENTOR(S) : John M. McKinney, et al.

It is certified that error appears in the above-identified patent and that said Letters Patent is hereby corrected as shown below:

Col. 14, line 33, change "4" to --1--; and

Col. 15, line 3, change "f" to --of--.

Signed and Sealed this

Seventeenth Day of November, 1992

Attest:

DOUGLAS B. COMER

Attesting Officer      Acting Commissioner of Patents and Trademarks